United States Patent [19]
Courtney

[11] Patent Number: 5,490,590
[45] Date of Patent: Feb. 13, 1996

[54] CHAIN WEAR MONITOR

[76] Inventor: David Courtney, 29102 Glenwood Rd., Perrysburg, Ohio 43551

[21] Appl. No.: 406,375

[22] Filed: Mar. 17, 1995

[51] Int. Cl.$^6$ ................................................. B65G 43/00
[52] U.S. Cl. .................................... 198/502.4; 198/502.1
[58] Field of Search .............................. 198/323, 502.1, 198/502.3, 502.4

[56] References Cited

U.S. PATENT DOCUMENTS

| | | | |
|---|---|---|---|
| 2,792,106 | 5/1957 | Fredh et al. | 198/502.4 |
| 3,780,297 | 12/1973 | Geary | 198/502.4 |
| 4,119,055 | 10/1978 | Ward et al. | 198/502.4 X |
| 4,258,840 | 3/1981 | Conkle | 198/502.4 |
| 4,282,967 | 8/1981 | Boling et al. | 198/502.4 |
| 4,366,897 | 1/1983 | Azuma et al. | 198/502.4 |
| 4,407,162 | 10/1983 | Landenberger | 198/502.4 X |
| 4,448,820 | 5/1984 | Buschor | 198/502.3 X |
| 4,863,006 | 9/1989 | Kotkata et al. | 198/502.4 X |

FOREIGN PATENT DOCUMENTS 0569674  4/1977  U.S.S.R. ............................ 198/502.4

*Primary Examiner*—D. Glenn Dayoan
*Attorney, Agent, or Firm*—Marshall & Melhorn

[57] ABSTRACT

The present invention provides a chain wear monitoring device for monitoring chain wear in a chain drive conveyor system. The chain wear monitor electronically measures, calculates, records, and reports the amount of chain wear along the entire length of the conveyor chain. The monitor calculates the wear as the number of inches per nominal ten foot section of chain. A large diameter measuring wheel is rotatably mounted on a shaft extending from the monitor control box. An encoder connected to the wheel is used measure the distance of the chain and a proximity sensor counts the links. A magnetic assembly may be fixed to the chain to cause the monitor to automatically start and stop a data recording session for a chain on a conveyor system at the same spot each time the chain is monitored, facilitating section by section comparison of chain wear.

16 Claims, 3 Drawing Sheets

CHAIN WEAR MONITOR

BACKGROUND OF THE INVENTION

1. Field of the Invention

The present invention relates to a monitoring device to monitor, record, and report chain wear for entire lengths of conveyor chains, and more particularly, to a portable monitoring device which attaches to an "I" beam of a chain drive conveyor system, and which electronically monitors and measures the entire chain in nominal ten foot increments to determine the chain wear.

2. Summary of Related Art

Chain drive conveyor systems are used throughout industry to move production assemblies and parts throughout a production facility. A plurality of trollies or other fixtures are interlinked with the chain at specific intervals such that the trollies are pulled by the movement of the chain in the chain drive conveyor system. Production parts and subassemblies are connected to the trollies. The layout and speed of the chain drive conveyor system is designed such that the right part is delivered to the right work station at the desired time in the production process. In many heavy industries, such as automotive plants, the plants will have multiple chain drive systems.

The overall chain length in a chain drive conveyor system can range from several hundred feet to several miles of chain. The links in the chain are made from forged steel with link pins connecting the adjacent links. The links in the chain gradually wear out during normal operation, and one or more links will eventually fail. The rate of wear depends on a number of factors, including the quality of the forged steel, the configuration of the chain, the weight of the loaded trollies being moved along the path of the chain, and other similar factors.

The chain for a chain drive conveyor system is quite expensive, with most chains costing several hundreds of thousands of dollars. Maintaining an inventory of replacement chains can be very expensive. Although a chain drive generally has uniform wear, a failure of one link will cause a break in the chain and the shutdown of the total chain drive system. In many chain drive applications, such as in automotive plants, production downtime can cost hundreds of thousands of dollars in a relative short period of time. A chain drive cannot be easily replaced and must generally be done as part of a planned periods of maintenance when the production operations are not in operation.

Because the chain of the chain drive system is expensive, and because production downtime is expensive, production engineers and maintenance staff have developed maintenance programs to maximize the financial return on the chain drive system by determining the optimum time to replace the chain in a chain drive system. The chain life may vary from two to ten years, depending on the application, with most chains being replaced every five to six years. Defective chain or excessive pressure on the take drive of the system can cause premature failure.

A power transmission chain in a chain drive conveyor system is typically formed by alternating links of rods and plates connected at each end by a link pin. The rods include a center aperture used to secure a trolley which is driven along the length of the conveyor. The chain wears at the ends of the links at the pin connection as the chain is driven along the length of the conveyor. Many chains are lubricated in an effort to reduce chain wear which occurs during operation.

The links are sized such that the pin-to-pin measurements are a standard length, with the most common sizes for links being three inches, four inches, and six inches. In a new chain, a ten foot segment of chain would be formed by forty of the three inch links, thirty of the four inch links, or twenty of the six inch links, depending on which of the standard size chain links are used in the chain drive conveyor system.

The most prevalent means for monitoring chain wear of a chain drive conveyor system in industry today is to manually measure the length of one or more segments of the chain, the segment of chain being determined by the number of links which would constitute a ten foot segment of new chain (40, 30, or 20 links generally). When new, the nominal segment of chain would measure ten feet. As the chain wears, the length of the segment gradually increases as the pins wear into the outer ends of the links. The general rule of thumb in industry is that when the segment of chain reaches a length of ten feet, four inches, the chain is ready to break and should be replaced. The four inch increase in length is merely a general guideline for replacement purposes.

The manual system requires an individual to count the links and measure the distance with a tape measure. The typical maintenance program includes measuring one or two segments of the chain, which on a typical 2000 foot chain is less than a 1% sample. Measuring additional segments is possible, but is expensive and time consuming for the equipment engineers and maintenance staff to manually measure multiple segment. Marking one or more segments for repeat measurement is also possible, but it is often difficult to locate the mark when subsequent measurements are to be taken.

A situation which frequently arises is that the chain will be lengthened after the initial installation of the chain drive conveyor system due to a change in the path of the assembly operations. Instead of buying a new chain, the existing chain is lengthened by adding links to the chain. The additional links are either new links which have never been used or old links from a used chain. In either case, the wear condition of the additional links is not representative of the wear condition of the majority of the chain. The manual chain wear measurement techniques do not provide reliable monitoring of such a chain configuration.

Recording and tracking the results is also inconvenient when chain wear is measured manually. To gain a reasonable benefit from such information requires a commitment of the maintenance staff to log and track the results on a regular basis and to monitor trends in the wear of the chain links. Two individuals are typically needed to measure and write down information. The chain is covered with lubricants and is messy to work with and write down data. The initial data must then be logged or entered into a computer system to provide a usable history of the chain wear condition.

SUMMARY OF THE INVENTION

In accordance with the present invention, there is provided a chain wear monitoring device for monitoring the chains in a chain drive conveyor system. The chain wear monitor of the present invention monitors, records, and reports the amount of chain wear along the entire length of the conveyor chain.

The monitor is generally designed as a portable device such that the monitor can be conveniently moved from one chain drive system to another as part of an overall monitoring program. The monitor includes a rechargable battery to supply all of the power necessary to operate the microprocessor and other control components.

The monitor is provided with an adjustable mounting bracket which is designed for support the full weight of the monitor on the conveyor "I-beam". Vertical and horizontal adjustments are provided to ensure a secure mounting with the proper positioning of the measuring wheel and sensors adjacent the chain.

A large diameter measuring wheel is rotatably mounted on a shaft extending from the monitor control box. An encoder connected to the wheel is used measure the distance of the chain and a proximity sensor counts the links.

The monitor calculates the wear as the number of inches per nominal ten foot section of chain. Wear data is typically expressed as the number of inches in excess of ten feet.

Magnet assemblies may be fixed to the chain to cause the monitor to automatically start and stop a data recording session for a chain on a conveyor system at the same spot each time the chain is monitored, facilitating section by section comparison of chain wear.

A number of different conveyors may be monitored with all data stored in the memory of the monitor. An output port provides an interface to a computer. The monitor is programmed to permit data to be viewed and printed in graphic form or saved on a disk for future recall and comparison.

Periodically comparing the recorded chain wear profiles usually results in more accurate predictions for chain break downs, and better evaluation of chain replacement decisions and chain lubrication programs. The analysis and comparison of results over the entire chain length helps to identify problems such as excessive pressure on the take-ups or defective chain.

An object of the present invention is to provide an electronic means for measuring the chain wear as an increase in the length of a nominal ten foot section of chain. The monitor is programmed for ten foot segments because of the tradition of manually measuring the links for a nominal ten foot segment. The microprocessor technology permits the monitoring and analysis of the entire length of a conveyor chain.

Another object of the present invention is to provide a portable unit that is adaptable for use with a number of different chain drive conveyor systems. The standard mounting bracket can be used on systems with two, three, and four inch links. The physical size of the monitor unit and the data memory capabilities could be modified to accommodate a variety of chain drive applications.

A further object of the present invention is to include the control and memory capabilities for monitoring a number of chain drive conveyor systems in succession without having to download the information onto a computer.

An additional object of the present invention is to provide output data in graphic form for easy comparison of historical results. Specific chain length results can be read directly from the display on the monitor. The data can be temporarily stored and downloaded onto a computer for further analysis and storage.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
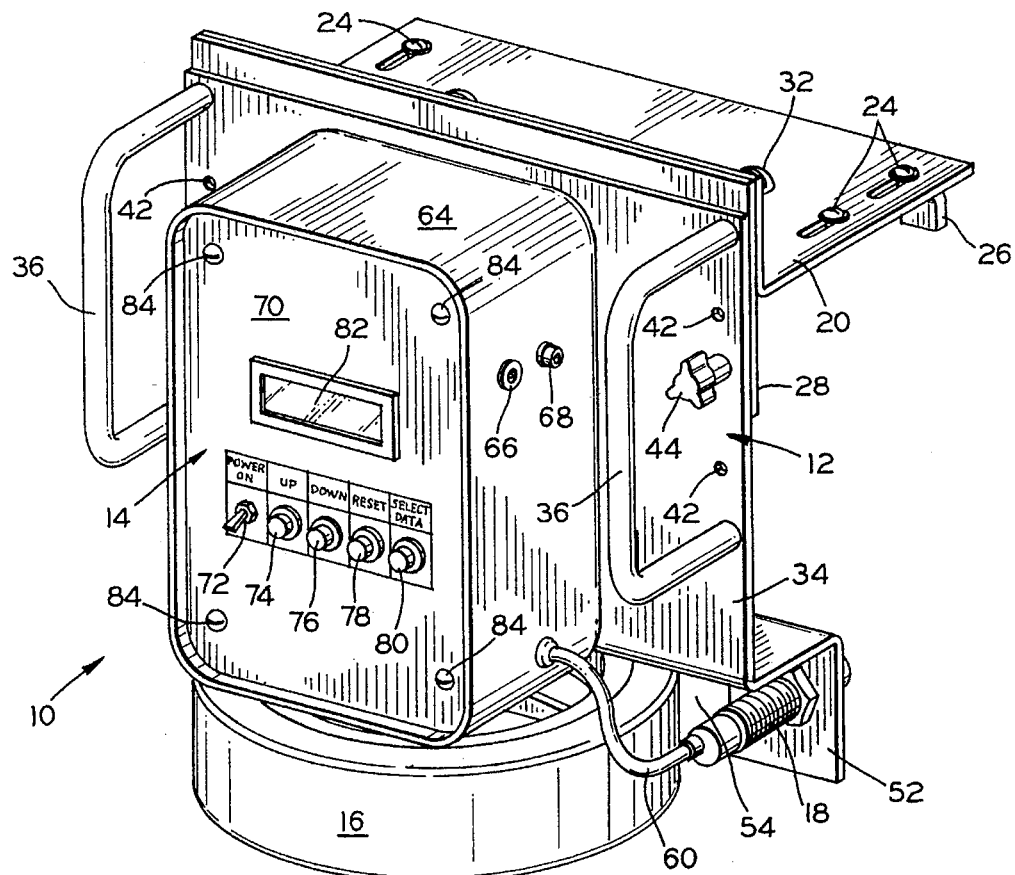
FIG. 1 is a perspective view of the chain wear monitoring device of the present invention.
Figure 2:
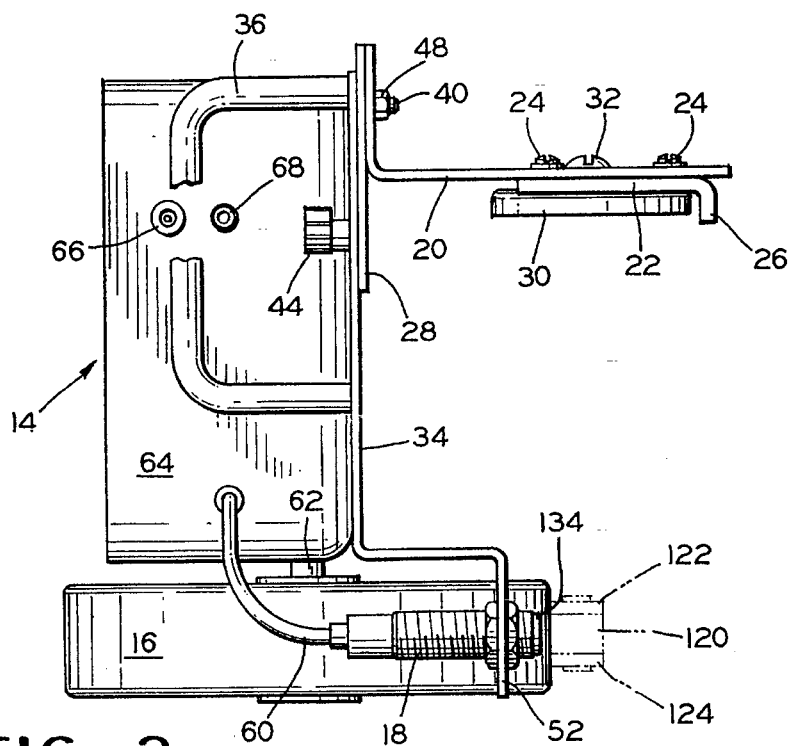
FIG. 2 is a side elevational view of the monitoring device.

Referring now to FIGS. 1-2, there is shown a chain drive monitor of the present invention 10. The main components of the monitor 10 include the frame 12, the controller 14, the measuring wheel 16, and the proximity sensor 18.

The frame 12 includes a top mounting bracket 20 which is secured on top of an I-beam used in a chain drive conveyor system. The top mounting bracket 20 is provided with catch hooks 22 secured to the underside of the bracket 20. The screws 24 used to secure the hooks 22 are adjustable so that the distance between the hook end 26 and the center plate 28 can be adjusted to match the width of the I-beam.

The top mounting bracket 20 also is provided with one or more magnets 30 secured to the bottom surface of the bracket 20 by bolts 32. The magnets 30 maintain the monitor 10 in the same position on the I-beam, eliminating any sliding or slippage of the monitor 10 during a data recording session.

The center plate 28 is positioned between the top mounting bracket 20 and the bottom mounting bracket 34. The handles 36 are attached to the front surface of the bottom mounting bracket 34 by recessed mounting screws 38. The handles 36 are used to carry the device and are conveniently located on the monitor 10 for two-handed lifting and positioning of the monitor 10 on an I-beam.

The center plate 28 provides additional stability to the monitor and facilitates vertical adjustment for locating the measuring wheel 16 and proximity sensor 18 in the desired position when the monitor 10 is mounted on an I-beam. The center plate 28 has four positioning bolts 40 permanently secured to the center plate 28. Two bolts 40 extend from the front surface of the center plate 28 through apertures 42 in the bottom mounting bracket 34 for large scale vertical adjustments. Wing nuts 44 are used to secure the center plate 28 and the bottom bracket 34 together. Two additional bolts 40 extend from the rear surface of the center plate 28 through a slot 46 in the top mounting bracket 20 for fine vertical adjustments. Nuts 48 are used to secure the center plate 28 and the top bracket 20.

Figure 3:
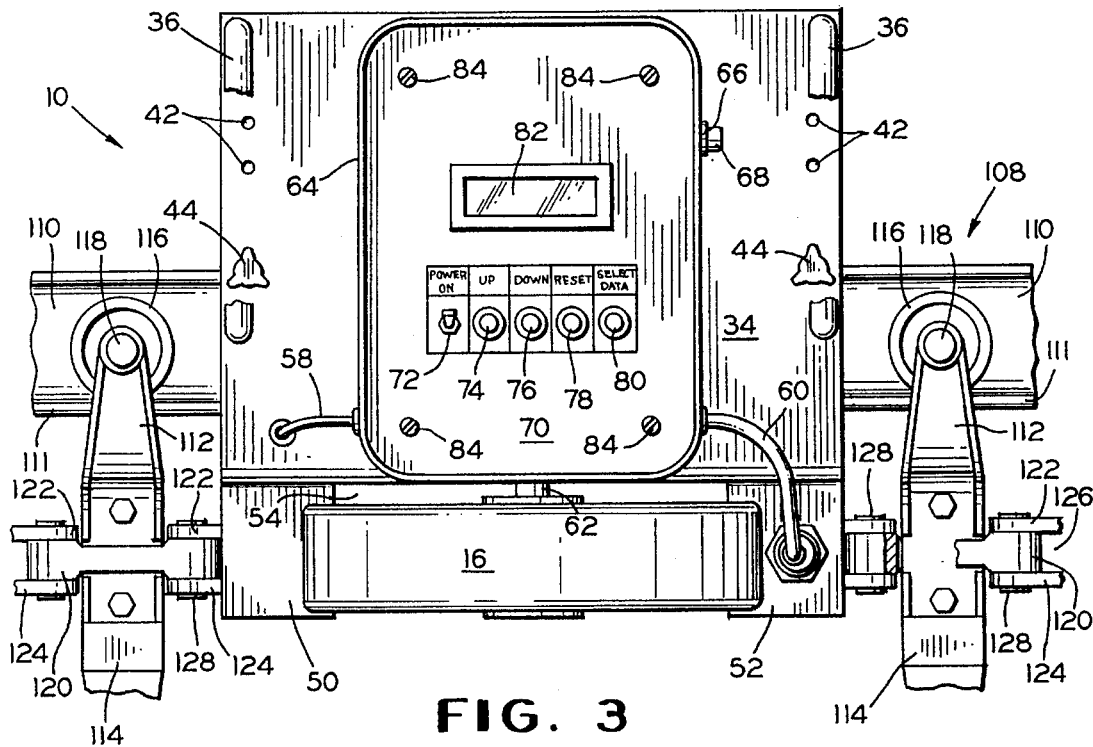
FIG. 3 is a front elevational view of the chain wear monitoring device mounted on the I-beam of a chain drive conveyor system.
Figure 4:
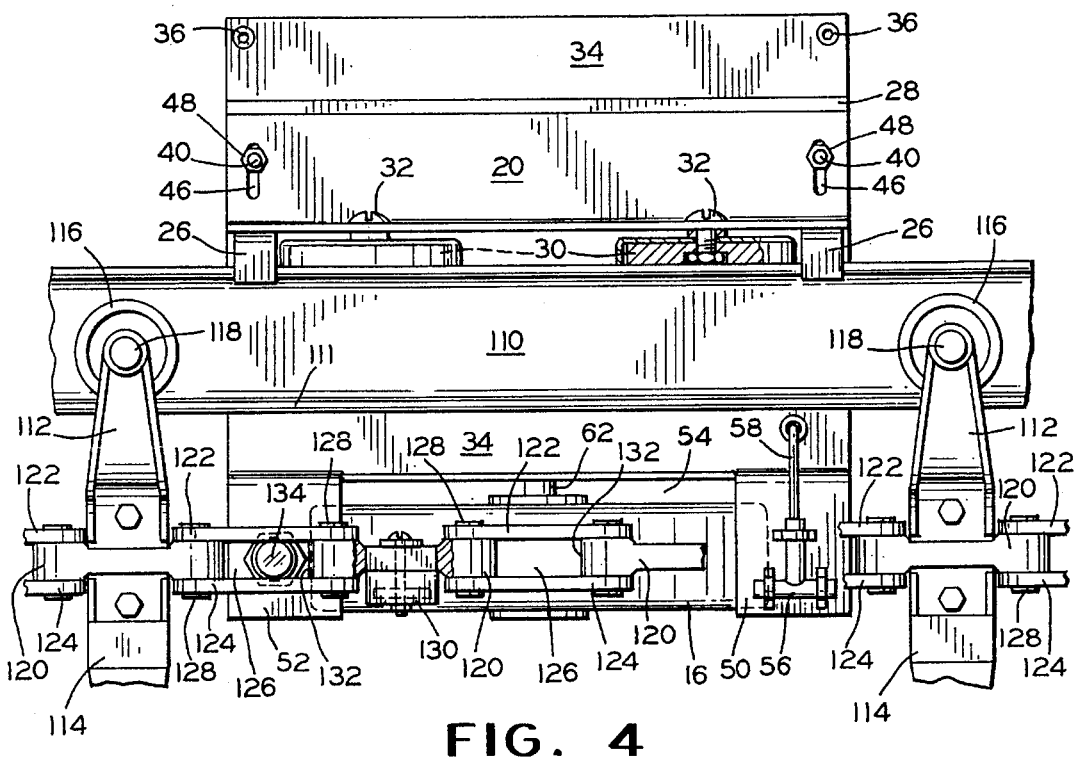
FIG. 4 is a back elevational view of the monitoring device showing the chain engaging the wheel of the monitoring device.

The bottom mounting bracket 34 has three pairs of apertures for the large scale adjustment. FIGS. 1 and 2 show the bolts 40 mounted in the center set of the three pairs of apertures 42. In FIGS. 3 and 4, the vertical spacing of the frame 12 has been narrowed to accommodate a smaller I-beam by moving the bolts 40 to the lower pair of apertures 42.

The bottom mounting bracket 34 includes a pair of end flanges 50, 52 for mounting the proximity switch 18 and a magnetic reed switch 56. The measuring wheel 16 extends through a center gap 54 located between the two flanges 50, 52. The top mounting bracket 20, center plate 28, and lower mounting bracket 34 are made from steel plate of other heavy gauge metal.

The reed switch 56 is mounted on the back surface of flange 50 and includes an electrical lead 58 extending through the flange 50 to the controller 14. The proximity switch 18 is mounted through flange 52 and is connected to the controller 14 by electrical lead 60.

The measuring wheel 16 is mounted on a shaft 62 extending from the lower bottom of the controller 14. The measuring wheel 16 rotates when engaged by the chain of an operational chain drive conveyor system.

The microprocessor and other electronic components of controller 14 are enclosed in a housing 64 which is appropriately sealed for the industrial environment where chain drive conveyor systems are typically used.

The side of the housing 64 includes an output port 66 for connecting the controller 14 to a remote computer system 67. A battery charging port 68 for charging the internal batteries 92 is also located on the side of housing 64.

The front panel 70 of the housing 64 includes a digital display 82 for displaying various information which has been processed by the controller 14 during a data recording session. The switches mounted on the front panel 70 include a power switch 72, up and down switches 74, 76 for setting chain parameters, a reset switch 78, and a select data switch 80. The front panel 70 is secured to the housing 64 by bolts 84 received at anchor points 86 on the back panel 88 of the housing 64.

Figure 5:
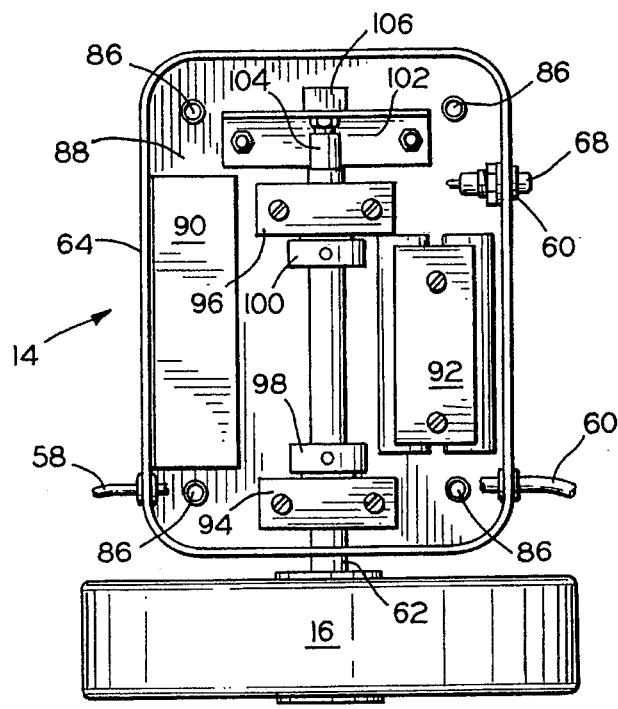
FIG. 5 is an internal view of the control housing showing the microprocessor, the battery pack, and the wheel shaft.
Figure 6:
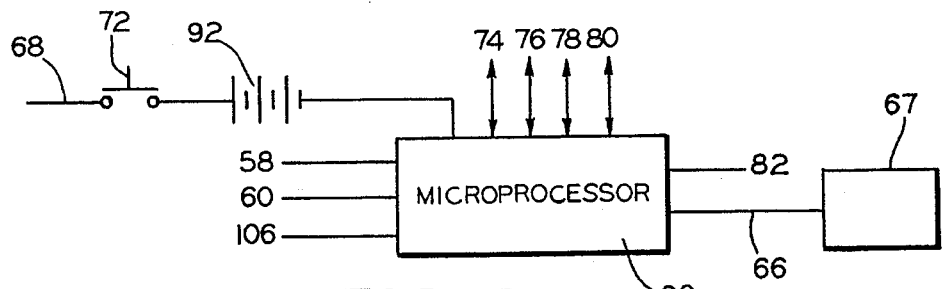
FIG. 6 is a schematic of the electrical system for the monitoring device.

FIG. 5 shows the components mounted inside the housing 64 of the controller 14. The microprocessor 90 includes the microprocessor chips, memory, and RAM storage for receiving, processing, calculating, storing and transmitting data. The microprocessor 90 is programmed and appropriate software is provided to permit a remote computer 67 to receive, view, print, and store data regarding chain wear.

The microprocessor 90 receives input signals from the five front panel switches 72, 74, 76, 78, 80, the measuring wheel encoder 106, the proximity sensor 18, and the magnetic reed switch 56. The output signals from the microprocessor 90 are transmitted to the display 82 and to the computer port 66 for transmittal to a remote computer 67. The microprocessor 90 is powered by rechargeable batteries 92. The batteries 92 are connected to port 68 for recharging purposes.

The measuring wheel 16 may be formed from a urethane material with a preferred diameter of eight inches. The urethane construction provides excellent friction to ensure proper engagement of the chain without any slippage. Other materials with the desired friction characteristics could also be used. The chains used in a chain drive system are covered with oil or other lubricants, which would have a tendency to slip on the wheel unless the proper friction material is used for the wheel 16.

The wheel is mounted on a shaft 62 which extends from the housing 64. The shaft 62 is retained in the housing 64 by shaft mounting blocks 94, 96 affixed to the back panel 88 of the housing 64 in combination with the bearings 98, 100 mounted on the shaft 62 adjacent the blocks 94, 96. The positioning of the bearings on the shaft 62 between the blocks 94, 96 limits the axial movement in either direction and provides sufficient support to secure the shaft 62.

A flexible coupling 104 is used to connect the shaft 62 to the encoder 106 mounted on internal bracket 102. The encoder 106 translates the rotational movement of the shaft 62 into a corresponding electrical signal. The signal is processed by the microprocessor 90 to obtain a distance measurement at the circumference of the wheel 16 based on the rotational movement of the shaft 62. The microprocessor 90 is programmed such that the rotational movement of the wheel 16 can be calibrated to provide accurate rotational measurements for processing.

The flexible coupling 104 provides improved performance in a challenging environment. A chain drive conveyor system is not always a smooth operation. The chain will often jerk or otherwise have some play in the chain. The bearings 98, 100 and the flexible coupling 104 can accommodate some axial movement and still maintain accurate rotational distance measurements as the chain is pulled past the wheel 16.

The monitor 10 is shown mounted on a chain drive conveyor system 108 in FIGS. 3, 4. Components of the chain drive conveyor system 108 include the I-beam 110, the plurality of trolleys connected by trolley shafts 114 to Y-shaped yokes 112, a pair of roller bearings 118 mounted on opposite sides of the I-beam 110, and the chain 121. The yokes 112 are connected to the roller bearing 116 by connectors 118. The roller bearings roll on the bottom rail 111 of the I-beam 110 as the chain 121 pulls the yokes 112 and the trolleys along the path of the conveyor system 108.

The chain 121, which is well known in the art, is comprised of a plurality of links formed of alternating rods 120 and pairs of plates 122, 124. The rods 120 are typically forged steel links with a vertical, longitudinal aperture for receiving a link pin connector 128 at each end of the aperture. The pairs of plates 122, 124 are formed into links through connection at each end by the link pin connector 128. The plates 122, 124 and link pins 128 are known in the art and include are interlinked with the rods 120 at each end. The plates 122, 124 remain in parallel, spaced apart relationship such that a horizontal aperture 126 is formed between the plates 122, 124.

The yokes 112 are inserted through vertical apertures in the rods 120 at the desired intervals for transportation about the path of the conveyor 108. Some of the vertical apertures in the rods 120 will have only the link pins 128 at each end, and other vertical apertures will have link pins 128 at each end plus a yoke 112 in the same vertical aperture between the pins 128.

The horizontal apertures 126 formed between the plates 122, 124 all remain open without any trolley yokes 112. The horizontal apertures 126 are used by the drive system (not shown) of the chain drive conveyor to pull the chain 121 along its path.

As the chain 121 is drawn along the path of the conveyor system 108, the lapping action of the link pins 128 causes wear at the ends of the rods 120 and at the link pins 128. The link pins 128 are design not to rotate, which creates substantial friction and wear as the chain 121 moves along its path. As the rods 120, plates 122, 124, and link pins wear out, the link pins 128 gradually move to the outer ends and become further and further apart. The wear of the rods 120, the plates 122, 124, and the pins cause the overall length of the chain 121 to increase.

The increase in the overall length is used to determine chain wear and eventual failure of the chain 121 in the conveyor system 108. The general rule of thumb is that when a nominal 10' segment of chain has a achieved a length of 10'4", the chain 121 is likely to fail and should be considered for replacement.

The back view of the monitor 10 in FIG. 4 shows the chain 121 engaging the measuring wheel 16. As the chain 121 is pulled, the friction between the wheel 16 and the chain 121 causes the wheel 16 and the shaft 62 to rotate. The encoder 106 generates a corresponding signal to the microprocessor 90.

The proximity switch 18 may be a metal sensitive switch or a photoelectric sensor positioned in the path of the chain 121. The sensor head 134 detects the leading edge 132 of the solid rods 120 as the rods 120 pass by the sensor head 134. By counting the leading edges 132 of the rods 120, the total number of links, including the plates 122, 124, can be calculated.

A magnetic assembly 130 may be fixed to the chain 121 to start and stop data recording sessions. The magnetic assembly 130 is detected by the magnetic reed switch 56, which signals the microprocessor to start a new cycle of measurement data. When the magnetic assembly 130 passes the reed switch 56 a second time, the second signal stops the data collection and stores the measurement data for ' the entire chain 121. By starting and stopping at the same segment of chain 121 each time, a section by section comparison of the entire chain 121 can be obtained. The magnetic assembly 130 is formed by enclosing a bar magnet in a housing such that the magnet is aligned with the links of the chain 121. The housing with magnet is then secured in the aperture of a rod 120 by a bolt and nut, or other acceptable fastening means.

The wheel 16 and the sensor head 134 of the proximity switch 18 should be positioned in the path of the chain 121. A misaligned chain 121 can cause errors in counting the links, or cause the chain 121 to slip off of the wheel 16. Such problems would obviously cause inaccuracies in the data obtained.

The monitor 10 of the present invention is shown as a portable model which can be moved from conveyor system to conveyor system. However, the monitor 10 could also be permanently installed to a chain drive conveyor system and be used for continuous monitoring of a chain drive conveyor system. In a permanent installation, the monitor 10 is in electrical communication with a computer 67 such that the computer 67 continuously monitors the chain wear. The computer could store information and monitor current conditions such that an alarm is activated when the chain wear has reached a preset level.

In operation, the first step is to make sure that the monitor 10 is securely mounted on the I-beam 110, and that the wheel 16, the proximity switch 18, and the reed switch 56 are in line with the path of the chain 121. The chain 121 must properly engage the wheel 16 to ensure the frictional rotation of the wheel as the chain drive is pulled along the path of the conveyor system 108. The frame 12 can be adjusted horizontally and vertically to obtain the proper positioning.

Power is turned on by the switch 72. The rods 120 and the plates 122, 124 come in standard lengths of 3", 4" and 6". The select data switch 80 is pushed until chain type is displayed. The up switch 74 and down switch 76 are used to select the length of chain link present in the chain 121 on the conveyor system 108.

For a nominal chain length of 10', the microprocessor calculates the number of links (40, 30, or 20) which need to be counted for a reading of the wear of the chain 121.

The select data, up, and down switches 80, 74, 76 are also used to calibrate the encoder 106 to the circumference of the wheel 16, and to select a chain number (1 to 5) for the data monitoring session. The encoder 106 should be calibrated to ensure accurate readings. The encoder will be set for a specific number of pulses per revolution, such as 480 pulses per revolution.

In practice, a maintenance technician will position the monitor 10 on a first conveyor to store data. Once a data session is complete on the first conveyor system, the monitor 10 can be move directly to a second conveyor system for collection of data. The memory stored in the microprocessor does not have to be reviewed and saved externally when moving to a new conveyor system.

The use of a magnetic assembly 130 facilitates the section by section comparison for an entire length of chain 121. The first time the magnetic assembly 130 passes the reed switch 56, the memory in the microprocessor for the selected chain number is erased and a data recording session is started to collect data on each of the segments of the chain 121. When the reed switch 56 is activated a second time, the data collected during the completed session is stored in memory for future readout in the display 82 or for transmittal and display at the remote computer 67. The monitor may then be moved to the next conveyor system for similar data recording session of another chain. If a magnetic assembly is not used, the multiple cycles may be stored in the memory of the microprocessor 90, and the microprocessor will continue to store information until the monitor 10 is removed from the chain drive conveyor system 108 or until the micro processor 90 runs out of memory.

To collect data, the sensor 18 counts the leading edges of the rods 120 and calculates the number of links which have passed the sensor head 134. The sensor 18 may be a proximity sensor, a photoelectric sensor, or similar sensor for detecting the alternating configuration of the rods 120 and the aperture 126 as the chain 121 passes the sensor 18. When the appropriate number of links have been counted, the microprocessor 90 stores the length of chain based on a signal from the encoder 106 and immediately starts a new measuring cycle to measure the length of the very next segment of chain 121.

The select data, up, and down switches 80, 74, 76 are used to display information during or after a data gathering session. Information may be displayed in the display 82 or may be transmitted to a remote computer for analysis. "Sections Measured" displays the total number of 10 foot sections measured. "Maximum Chain Wear" and "Minimum Chain Wear" display the wear for the section with the most or least wear in inches per 10 foot section.

"Average Chain Wear" is the data selection from switch 80 to display the average wear for all sections measured in inches per 10 foot section. "last Section Wear" displays the wear for the last section of chain. Any section in memory may be displayed by using the up and down switches 74, 76 to select the section. The final display feature option is to display the current chain speed in feet per minute.

Once the data is completed for a chain of a specific conveyor, the information can be view on the display 82. The monitor 10 could be moved to a second chain for a data recording session. The monitor could be connected by an interface cable from the output port 66 to the computer 67. A software disk can be provided to program the computer to transfer data to the computer. The chain wear profiles can be viewed, printed, or stored. The memory on the microprocessor 90 is maintained in storage, even if power is lost to the microprocessor 90.

Data recording sessions can be conducted on a regular basis so that a complete wear history can be obtained and monitored on desired chain drive systems. Periodically comparing chain wear profiles will permit more accurate prediction of chain replacement.

Figure 7:
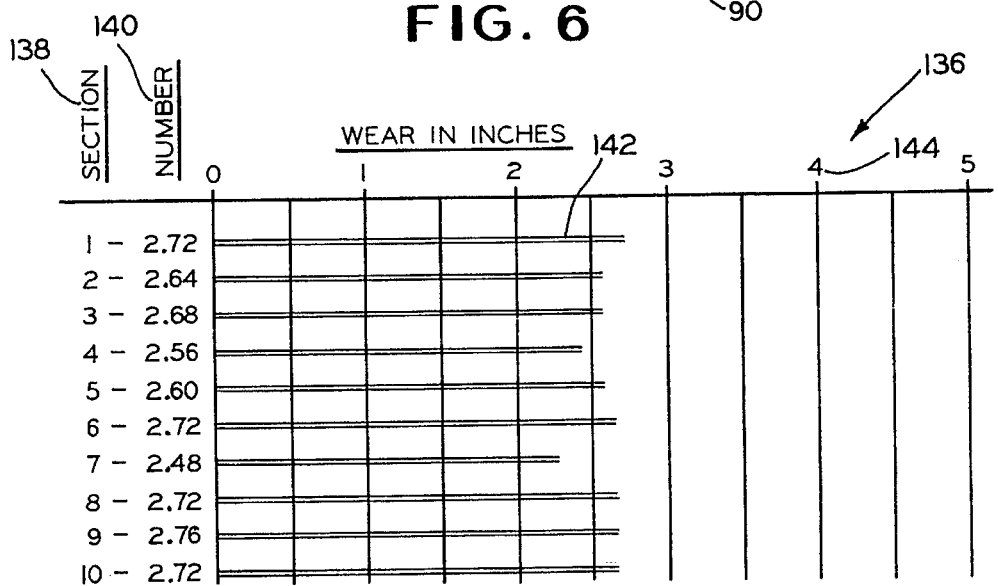
FIG. 7 is a chart and graph showing the output format of the information collected by the monitoring device.

FIG. 7 provides a typical profile 136 for ten segments of a chain 121. The first column 138 shows the specific segment of chain 121. Assuming a magnetic assembly 130 had been secured to the chain 121, the exact same segments could be monitored on a regular basis. The second column 140 shows the length of the segment for the specified number of links in inches greater than 10 feet.

For example, if the chain to be measured had 6" chain links, the microprocessor 90 would automatically be set to count 20 chain links per segment. The sensor head 134, based on leading edge detection, signals the link count to the microprocessor 90. The encoder 106 provides a signal indicating the 20 links of chain, which measure 10 feet when the chain was new, now measure 10' plus 2.72". Such information is graphed in the bar chart 142 for easier analysis. When the chain wear reaches the 4 inch mark 144, the user of the chain drive conveyor system 108 will typically replace the chain 121.

The monitor 10 of the present invention was described for use on a chain drive conveyor system 108. The monitor 10 can be sized for other chain drive uses where chain wear and breakdowns are a concern.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A chain wear monitor mounted on a chain drive system for counting a selected number of links in a section of chain and simultaneously measuring the length of the section of chain during regular operation of the chain drive system, said monitor comprising:
    a) a mounting bracket for positioning said bracket adjacent a chain on a chain drive system;
    b) a sensor positioned on said mounting bracket for sensing links in the chain as the chain drive system pulls the links pass said sensor, said sensor generating a counting signal in response to the links;
    c) a measuring wheel positioned adjacent said counting sensor and rotatably connected to a shaft mounted on said bracket such that the links in the chain engage and drive said measuring wheel as the chain drive system pulls the chain;
    d) an encoder connected to the shaft of said measuring wheel for generating a distance signal as the measuring wheel rotates;
    e) a controller electrically connected to said counting sensor and said encoder for receiving the counting signal and the distance signal, said controller calculating a distance measurement per selected number of links in a section of chain, and generating a corresponding output signal; and
    f) an output means for receiving the output signal and for indicating the distance per section of chain and other calculated data.

2. The chain wear monitor defined in claim 1, including a housing mounted on said mounting bracket for enclosing said encoder, said controller, and said output means.

3. The chain wear monitor defined in claim 2, wherein said output means in said housing includes a display means for displaying data at said housing.

4. The chain wear monitor defined in claim 1, wherein said output means includes an output port to facilitate communication of data to a computer system.

5. The chain wear monitor defined in claim 1, wherein said controller includes one or more switches for inputting a nominal link length for the links in the chain.

6. The chain wear monitor defined in claim 1, wherein said controller includes a means for calculating and storing a distance measurement for a plurality of sections of chain having a selected number of links per section.

7. The chain wear monitor defined in claim 6, wherein said controller includes a means for calculating and storing a distance measurement for a plurality of link sections for a plurality of chain drive conveyor systems.

8. The chain wear monitor defined in claim 6 wherein said controller includes a means for calculating a number of sections per chain drive system, a distance measurement for each chain drive section, an average distance measurement for all sections, and a chain speed for the chain drive system.

9. The chain wear monitor defined in claim 6, wherein said controller includes a means for calculating the distance measurement for a plurality of sections of the chain, and said output means includes a means for generating a graphical display of the distance measurements for a plurality of sections.

10. The chain wear monitor defined in claim 1 wherein said measuring wheel is made of urethane.

11. The chain wear monitor defined in claim 1 wherein said mounting bracket includes an adjustment means for adjustably securing the monitor to an conveyor assembly.

12. The chain wear monitor defined in claim 1 wherein said mounting bracket includes an adjustment means for adjustably positioning said counting sensor and said measuring wheel.

13. The chain wear monitor defined in claim 1 wherein said controller includes a means for calibrating said measuring wheel and said encoder to generate an accurate distance signal.

14. The chain wear monitor defined in claim 1 including a magnetic assembly secured to the chain and a magnetic sensor positioned on said mounting frame for detecting said magnetic assembly as the chain passes by said magnetic sensor.

15. The chain wear monitor defined in claim 14 wherein said controller commences a data recording session for all sections in the chain when the magnetic assembly is detected a first time, and stores the recorded data in memory when the magnetic assembly is detected a second time.

16. A chain wear monitor mounted on a chain drive system for counting a selected number of links in a section of chain and simultaneously measuring the length of the section of chain during regular operation of the chain drive system, said monitor comprising:
    a) a mounting bracket for positioning said bracket adjacent a chain on a chain drive system;
    b) a sensor positioned on said mounting bracket for sensing links in the chain as the chain drive system pulls the links pass said sensor, said sensor generating a counting signal in response to the links;
    c) a measuring wheel positioned adjacent said counting sensor and rotatably connected to a shaft mounted on said bracket such that the links in the chain engage and drive said measuring wheel as the chain drive system pulls the chain;
    d) an encoder connected to the shaft of said measuring wheel for generating a distance signal as the measuring wheel rotates;

e) a magnetic assembly secured to one of the links in the chain;

f) a magnetic sensor positioned on said mounting frame for detecting said magnetic assembly and generating a session signal;

g) a controller electrically connected to said counting sensor, said encoder and said magnetic sensor for receiving the counting signal, the distance signal, and the session signal, said controller calculating a distance measurement per selected number of links in a section of chain, repeating the calculation process for every section in the chain, storing the distance measurement for each section of chain, and generating a corresponding output signal; and f) an output means for receiving the output signal and for indicating the distance per section of chain and other calculated data.

* * * * *